(12) United States Patent
Abou-Nasr et al.

(10) Patent No.: US 9,344,011 B2
(45) Date of Patent: May 17, 2016

(54) SYSTEMS AND METHODS FOR GENERATING POWER FOR AN ELECTRIC SUB-ASSEMBLY OF A MOTOR VEHICLE

(71) Applicant: FORD GLOBAL TECHNOLOGIES, LLC, Dearborn, MI (US)

(72) Inventors: Mahmoud A. Abou-Nasr, Dearborn, MI (US); Dimitar Petrov Filev, Dearborn, MI (US); Cynthia Mowery Flanigan, Dearborn, MI (US); David Scott Rohweder, Dearborn, MI (US); Janice Lisa Tardiff, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 308 days.

(21) Appl. No.: 14/170,273

(22) Filed: Jan. 31, 2014

(65) Prior Publication Data

US 2015/0222204 A1    Aug. 6, 2015

(51) Int. Cl.
| | |
|---|---|
| *G01M 17/02* | (2006.01) |
| *B60C 23/02* | (2006.01) |
| *B60C 23/00* | (2006.01) |
| *B60C 19/00* | (2006.01) |
| *B60C 19/08* | (2006.01) |
| *G01L 17/00* | (2006.01) |
| *H02N 1/08* | (2006.01) |
| *H02N 99/00* | (2006.01) |
| *B60C 23/04* | (2006.01) |

(52) U.S. Cl.
CPC .............. *H02N 1/08* (2013.01); *B60C 23/041* (2013.01); *B60C 23/0493* (2013.01); *G01L 17/00* (2013.01); *H02N 99/00* (2013.01); *Y10T 29/49002* (2015.01)

(58) Field of Classification Search
None
See application file for complete search history.

(56) References Cited

U.S. PATENT DOCUMENTS

| | | | |
|---|---|---|---|
| 6,291,901 B1 | 9/2001 | Cefo | |
| 6,725,713 B2* | 4/2004 | Adamson | B60C 23/0411 73/146 |
| 6,847,126 B2* | 1/2005 | Adamson | B60C 11/00 152/152.1 |
| 7,415,874 B2 | 8/2008 | Mancosu et al. | |

(Continued)

FOREIGN PATENT DOCUMENTS

| | | |
|---|---|---|
| WO | WO-2012/032222 A1 | 3/2012 |
| WO | WO-2012/162241 A2 | 11/2012 |

OTHER PUBLICATIONS

T. Herndl et al., "An Energy Harvesting System for In-tire TPMS", http://www.powersoc.org/PwrSOC08/Presentations/Received/Poster%20P02%20-%20Thomas%20Herndl%20-%20An%20Energy%20Harvesting%20System%20for%20In-tire%20TPMS.pdf, retrieved from the internet on Jan. 31, 2014.

(Continued)

*Primary Examiner* — Peter Macchiarolo
*Assistant Examiner* — Jermaine Jenkins
(74) *Attorney, Agent, or Firm* — Jones Robb, PLLC; Raymond L. Coppiellie

(57) ABSTRACT

A system for generating power for an electric sub-assembly of a motor vehicle may include at least one reverse electrowetting energy harvesting element coupled to a tire of the motor vehicle. The system may further include at least one controller configured to accumulate electric energy generated by the at least one reverse electrowetting energy harvesting element and supply the accumulated electric energy to at least one sub-assembly mounted on the tire.

20 Claims, 8 Drawing Sheets

(56) References Cited

U.S. PATENT DOCUMENTS

| | | | |
|---|---|---|---|
| 7,687,943 B2 | 3/2010 | Lunde | |
| 7,760,080 B2 * | 7/2010 | Breed | B60C 23/0408 340/444 |
| 7,781,942 B2 | 8/2010 | Hatano | |
| 7,986,076 B2 | 7/2011 | Yoon et al. | |
| 8,035,502 B2 * | 10/2011 | Heise | B60C 23/0411 310/339 |
| 2003/0011276 A1 | 1/2003 | Nowottnick | |
| 2006/0255663 A1 * | 11/2006 | Vlad | H02N 2/18 310/26 |
| 2007/0028958 A1 | 2/2007 | Retti | |
| 2007/0205881 A1 * | 9/2007 | Breed | B60C 23/0433 340/447 |
| 2009/0072661 A1 | 3/2009 | Hatano | |
| 2009/0256361 A1 | 10/2009 | Theuss et al. | |
| 2012/0255349 A1 | 10/2012 | Pop et al. | |
| 2012/0326565 A1 | 12/2012 | Kuisma et al. | |

OTHER PUBLICATIONS

M. Löhndorf et al., "Evaluation of Energy Harvesting Concepts for Tire Pressure Monitoring Systems" pp. 331-334.

T. Krupenkin et al., "Reverse electrowetting as a new approach to high-power energy harvesting," Nature Communications, Aug. 23, 2011, 2:448, DOI: 10.1038/ncomms1454, www.nature.com/naturecommunications, Macmillan Publisher Limited.

Y. Hu et al., "A Nanogenerator for Energy Harvesting from a Rotating Tire and its Application as a Self-Powered Pressure/Speed Sensor," Adv. Mater., 2011, 23: 4068-4071. DOI: 10.1002/adma.201102067.

Westby et al., "Design and Modeling of a Patterned-Electret-Based Energy Harvester for Tire Pressure Monitoring Systems", Mechatronics, IEEE/ASME Transactions, Oct. 2012, pp. 995-1005, vol. 17, Issue 5, IEEEXplore Digital Library.

Kubba et al., 31$^{st}$ Annual Meeting and Conference on Tire Science and Technology, Sep. 18, 2012, The International Exposition (I-X) Center, Cleveland, OH, USA.

\* cited by examiner

SYSTEMS AND METHODS FOR GENERATING POWER FOR AN ELECTRIC SUB-ASSEMBLY OF A MOTOR VEHICLE

TECHNICAL FIELD

The present disclosure relates generally to systems and methods for generating power for an electric sub-assembly of a motor vehicle. More specifically, the present disclosure relates to systems and methods for generating power for an electric sub-assembly mounted on a wheel/tire of the vehicle.

BACKGROUND

It is difficult to supply power from the main power supply of a motor vehicle to an electric component or sub-assembly that is arranged within a rotating body of the vehicle (e.g., a wheel, tire, or rim of the vehicle). Accordingly, technologies, including, for example, tire pressure monitoring systems (TPMS), active road profile analysis systems, tire wear indicators, active air compression devices, and/or acceleration sensors, generally require a localized energy source to operate. Such technologies have been traditionally powered, for example, via batteries that are internal to the wheel/tire assembly. Size and weight constraints, however, generally limit the size and/or number of the batteries that may be used, and the subsequent amount of power that can be supplied by the batteries to the sub-assemblies. Furthermore, batteries have a finite life and will eventually need to be replaced, which generates waste and may be difficult and/or expensive.

It may, therefore, be advantageous to provide a localized energy source (i.e., internal to the wheel/tire assembly) that may generate power for such electric sub-assemblies. Various energy harvesting mechanisms have been developed that may convert mechanical energy to electrical energy via, for example, piezoelectric, electromagnetic, or electrode/dielectric devices. Such energy harvesting mechanisms, however, are generally limited in their power generation (e.g., by the mechanical forces that can be captured) and their structural design. Piezoelectric technologies, for example, generally use a cantilever beam energy harvesting device, which is limited to capturing a bending stress of the beam as the tire rotates. Electrode/dielectric technologies may include stretchable energy harvesting devices that are attached to a side face of the interior of the tire, and which are limited to specific geometries that are smaller than a contact patch of the tire with the road, in order to capture a strain occurring in the tire.

It may, therefore, be advantageous to provide an energy harvesting mechanism within the wheel/tire assembly that can utilize a broad range of mechanical forces and displacements to generate a large range of electrical currents and voltages. It may also be advantageous to provide an energy harvesting mechanism within the wheel/tire assembly that may have various configurations and/or geometries to provide both design flexibility and power maximization. It may be further advantageous to provide systems and methods for generating power that utilize such energy harvesting mechanisms to power sub-assemblies mounted on a tire of the vehicle.

SUMMARY

In accordance with various exemplary embodiments, the present disclosure provides a system for generating power for an electric sub-assembly of a motor vehicle. In accordance with various embodiments of the present disclosure, a system for generating power for an electric sub-assembly of a motor vehicle may include at least one reverse electrowetting energy harvesting element coupled to a tire of the motor vehicle. The system may further include at least one controller configured to accumulate electric energy generated by the at least one reverse electrowetting energy harvesting element and supply the accumulated electric energy to at least one sub-assembly mounted on the tire.

In accordance with various additional embodiments of the present disclosure, a method for generating power for an electric sub-assembly of a motor vehicle may include generating an electric current via at least one reverse electrowetting energy harvesting element coupled to a tire of the motor vehicle. The method may further include powering at least one sub-assembly associated with the tire with the electric current.

In accordance with various further embodiments of the present disclosure, a method of assembling a system for generating power for an electric sub-assembly of a motor vehicle may include embedding at least one reverse electrowetting energy harvesting element within a tire of the motor vehicle. The method may also include coupling the at least one reverse electrowetting energy harvesting element to at least one controller configured to accumulate electric energy generated by the at least one reverse electrowetting energy harvesting element and supply the accumulated electric energy to at least one sub-assembly mounted on the tire.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles of the disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
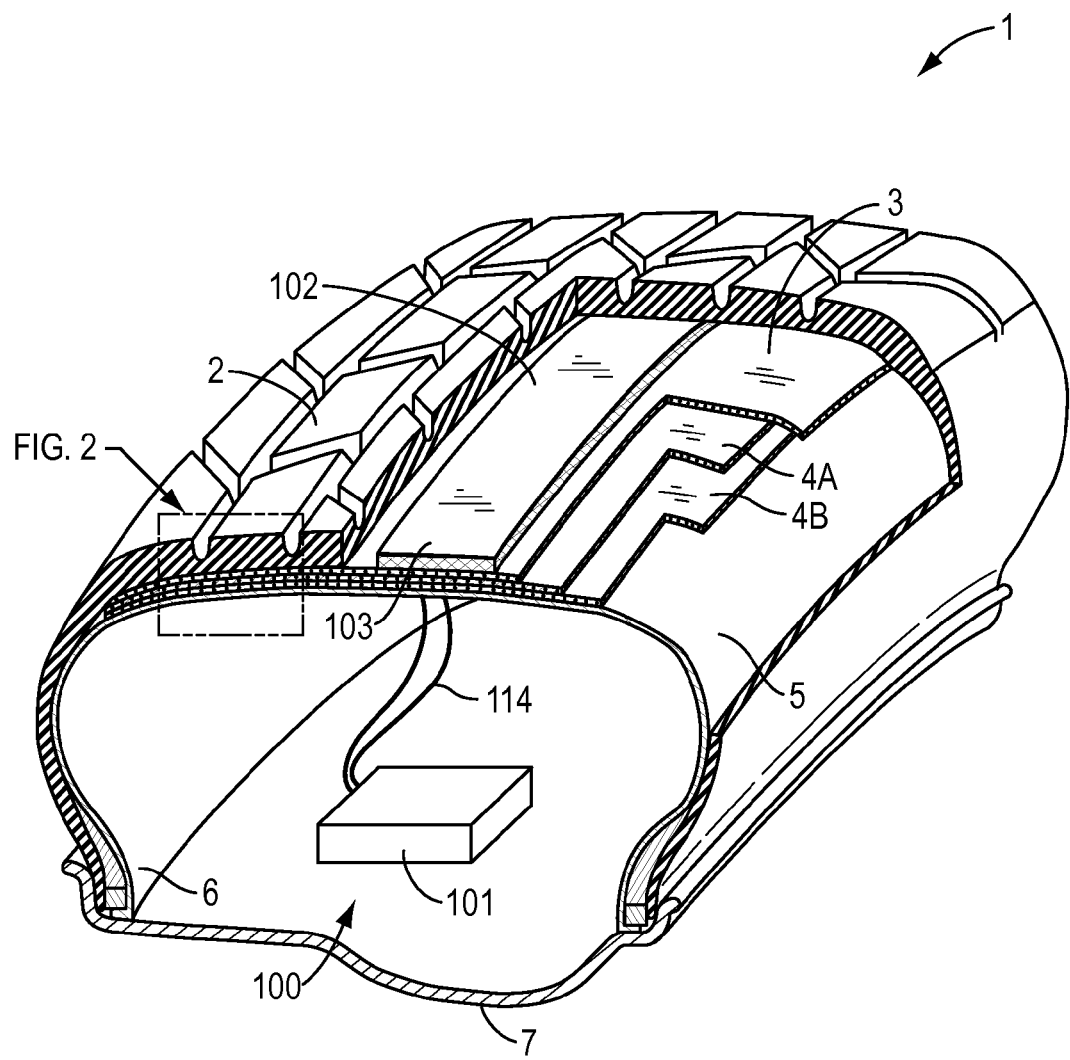
FIG. 1 is a schematic cross-sectional perspective view of a tire with an exemplary embodiment of a system for generating power in accordance with the present disclosure.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

In accordance with various exemplary embodiments, the present disclosure contemplates systems and methods for generating power for a vehicle sub-assembly associated with a rotating body of a motor vehicle, such as, for example, a sub-assembly mounted on a tire of the vehicle. For instance, the embodiments described herein may utilize one or more energy harvesting elements that are coupled to the tire to convert mechanical energy from the various mechanical forces and displacements acting on the tire (e.g., causing deformation and vibration of the tire as the tire revolves) to electrical energy. Various embodiments described herein, for example, contemplate a system for generating power comprising at least one reverse electrowetting energy harvesting element coupled to a tire of the motor vehicle and at least one controller configured to accumulate electric energy generated by the at least one reverse electrowetting harvesting element and supply the accumulated electric energy to at least one sub-assembly mounted on the tire, and methods which utilize such systems.

As understood by those of ordinary skill in the art, electrowetting refers to a phenomenon in which electrical energy is converted into mechanical energy of liquid motion through an electrically-induced change in the wettability of a dielectric surface. Reverse electrowetting, therefore, refers to a concept in which the electrowetting process is run in reverse to convert mechanical energy of liquid motion into electrical current. As described in detail in Krupenkin et al., *Reverse electrowetting as a new approach to high-power energy harvesting*, Nature Communications, Aug. 23, 2011 ("the Nature Article"), the entire content of which is incorporated by reference herein, the phenomenon of reverse electrowetting involves generating energy via the interaction of arrays of moving microscopic fluid droplets (i.e., of a conductive fluid) with an electrode (e.g., a multilayer film comprising an electrode and a dielectric). The fluid droplets and electrode are connected to an external electrical circuit that provides a constant bias voltage between the droplets and the electrode. An external mechanical actuation is then used to move the droplets in such a way as to force a decrease of the droplets' overlap with the electrode. This decrease in overlap results in a decrease of the total charge that can be maintained at the droplet liquid-solid interface. The excessive charge then flows back through the electrical circuit that connects the droplets and the electrode, generating an electrical current.

Figure 8A:
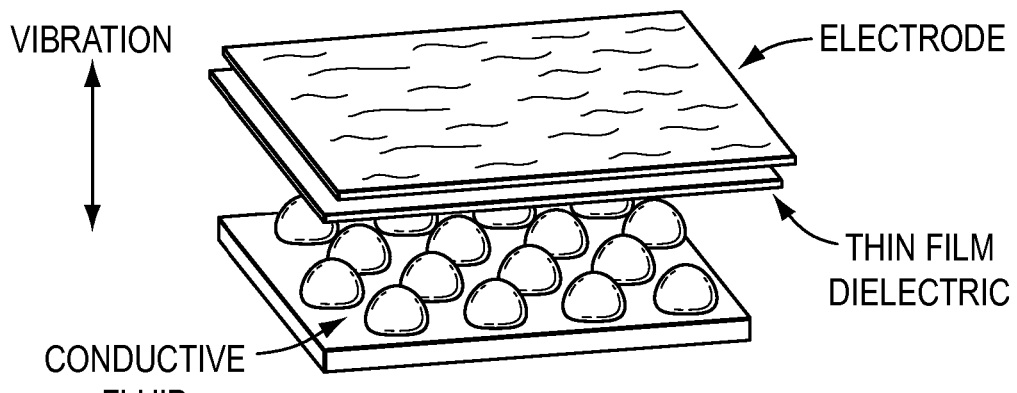
FIGS. 8A-8C show various schematic views illustrating different reverse electrowetting actuation mechanism geometries in accordance with exemplary embodiments of the present disclosure.
Figure 8B:
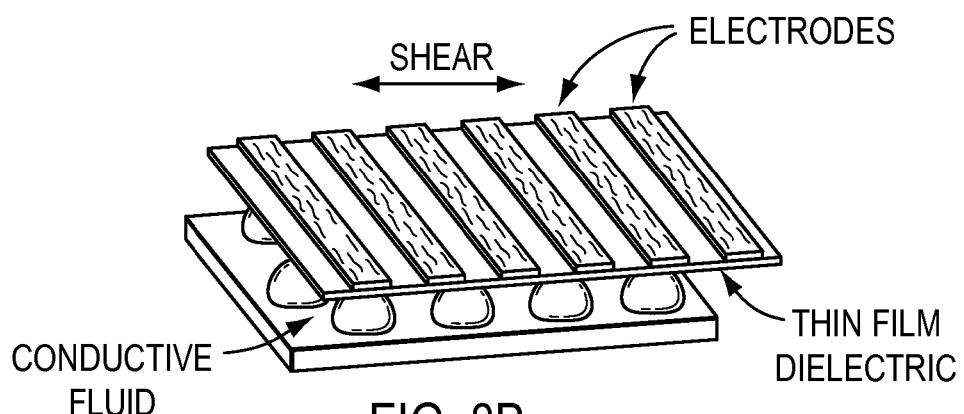
Figure 8C:
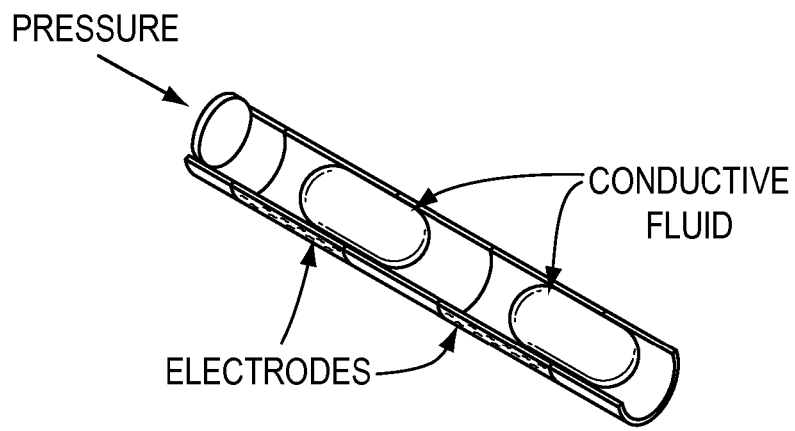

As illustrated in FIGS. 8A-8C, the conductive fluid droplets may be actuated, or moved, via various mechanisms and in a number of different geometries, including, for example, out-of-plane vibration in which the droplets are positioned between oscillating plates (see FIG. 8A), in-plane shear in which the droplets are positioned between sliding plates (see FIG. 8B), and/or in-channel droplet motion in which a pressure is applied to the droplets (see FIG. 8C). To further explain the above reverse electrowetting concept, the actuation mechanism of the exemplary geometry of FIG. 8C is explained below with reference to FIG. 9.

Figure 9:
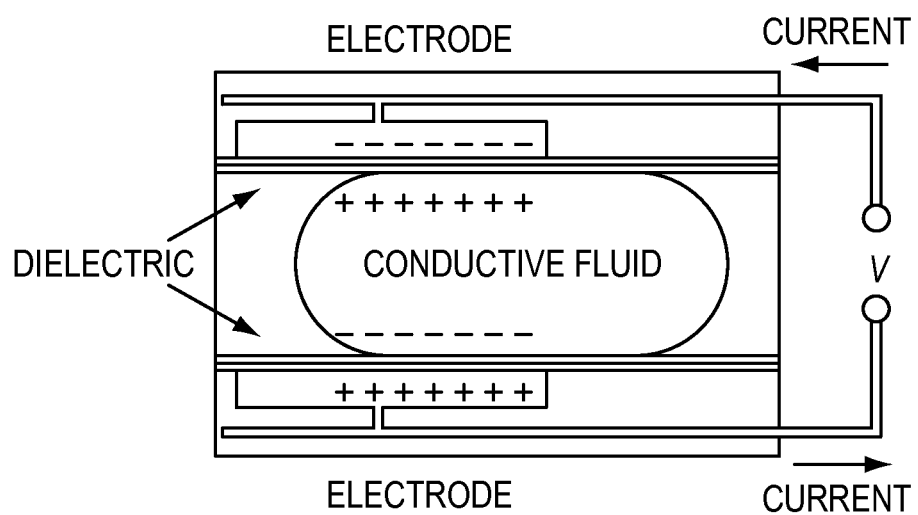
FIG. 9 shows a detailed schematic view illustrating the reverse electrowetting actuation mechanism of the geometry of FIG. 8C.

As illustrated in FIGS. 8C and 9, conductive fluid droplets are confined within a channel overlaid with thin-film-dielectric coated electrodes. As pressure is applied and removed, the droplets move in and out of alignment with the electrified electrodes. This movement changes the amount of the electrical charge at the electrodes, causing electrical current to flow as shown in FIG. 9.

Therefore, as used herein, the term "reverse electrowetting energy harvesting element" refers to any type and/or configuration of energy harvesting element, device, and/or component that utilizes the above described reverse electrowetting mechanism to covert mechanical energy to electrical energy. In accordance with various embodiments of the present disclosure, for example, a reverse electrowetting energy harvesting element that is coupled to a tire of a motor vehicle may utilize the above described reverse electrowetting mechanism to harness the mechanical energy associated with the cyclical bulk deformations and vibrations of the tire (i.e., as the tire rolls through a contact patch with the road), and convert that mechanical energy to electrical energy. Furthermore, the present disclosure contemplates reverse electrowetting energy harvesting elements having any actuation mechanism and/or geometry known to those of ordinary skill in the art, including, but not limited to, the exemplary geometries described above with reference to FIGS. 8A-8C.

Figure 2:
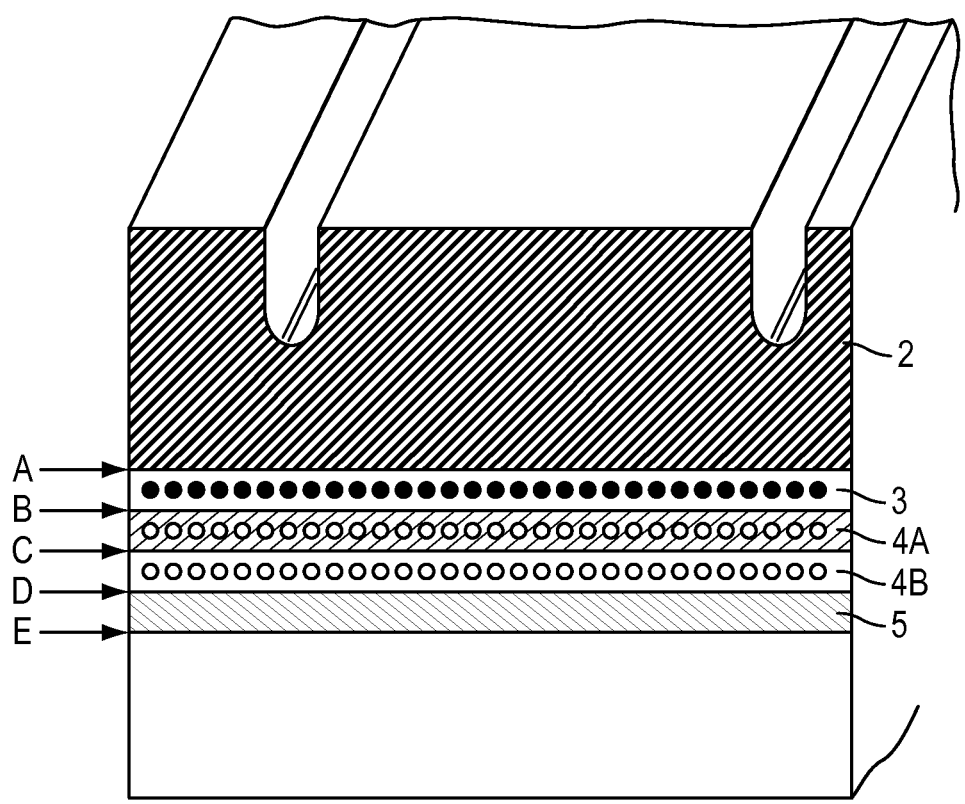
FIG. 2 shows a detailed view of the layered construction of the tire of FIG. 1.

FIG. 1 is a schematic cross-sectional perspective view of a tire 1 with an exemplary embodiment of a system for generating power 100 in accordance with the present disclosure. As illustrated in FIG. 1, the tire 1 is a tubeless radial tire that is held, for example, on a motor vehicle (not shown) by a rim 7 and a wheel (not shown). The tire 1 has various layers, including, for example, a tread 2, a body ply 3, steal belt layers 4A and 4B, and an inner liner 5, as perhaps best illustrated in the detailed view of FIG. 2.

Figure 3:
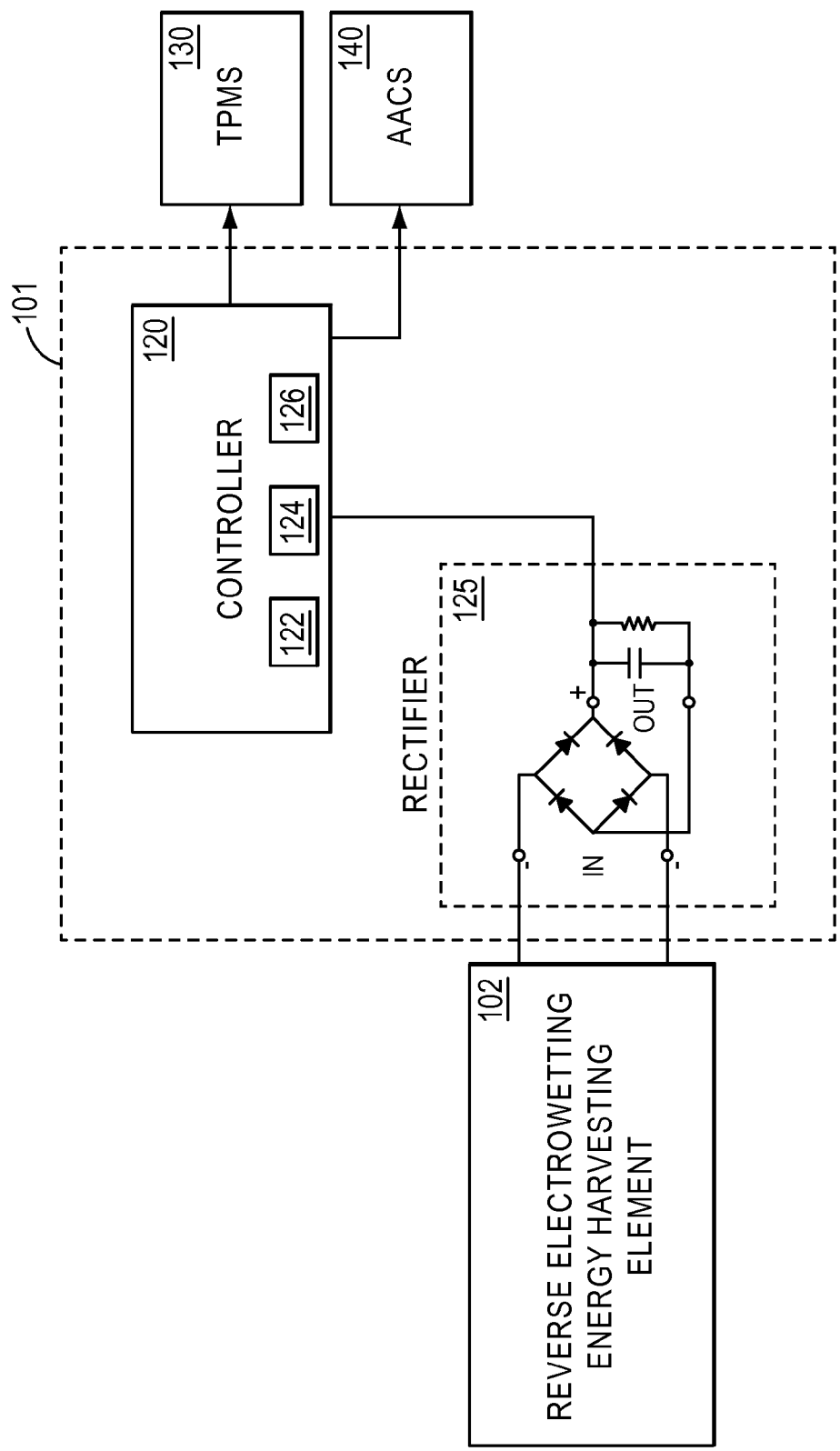
FIG. 3 is an electric block diagram illustrating the power generating system of FIG. 1.
Figure 4:
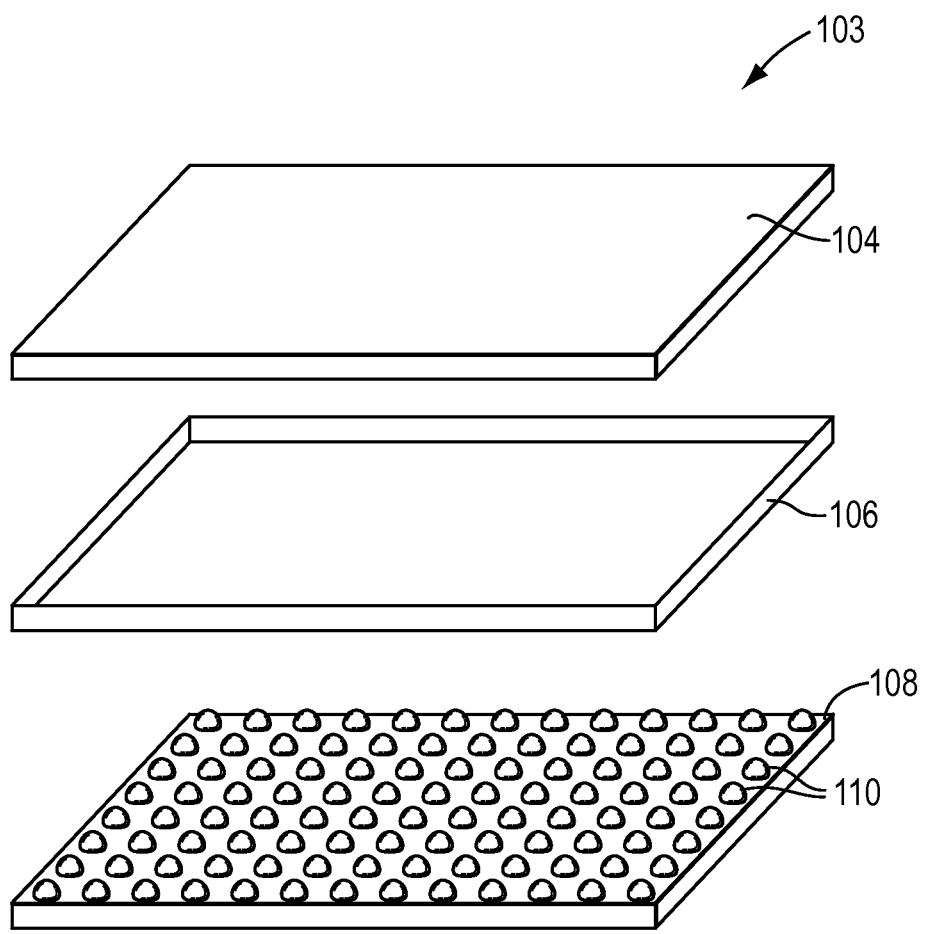
FIG. 4 is an exploded schematic view of an exemplary embodiment of a reverse electrowetting energy harvesting element in accordance with the present disclosure.

As illustrated in FIGS. 1 and 3, the system for generating power 100 includes at least one reverse electrowetting energy harvesting element 102 coupled to the tire 1 and at least one controller 120 (shown within a housing 101 in FIG. 1) configured to accumulate electric energy generated by the harvesting element 102, and supply the accumulated electric energy to at least one sub-assembly 130, 140 that is mounted on the tire 1. With reference to FIG. 1, in various embodiments, for example, the reverse electrowetting harvesting element 102 may include at least one reverse electrowetting pad 103 that is imbedded within the tire 1. As shown in FIG. 4, in accordance with the above described reverse electrowetting mechanism, in various exemplary embodiments, the reverse electrowetting pad 103 may include a thin-film-dielectric coated electrode 104, an elastic spacer 106, and an array 108 of conductive fluid droplets 110.

Figure 5:
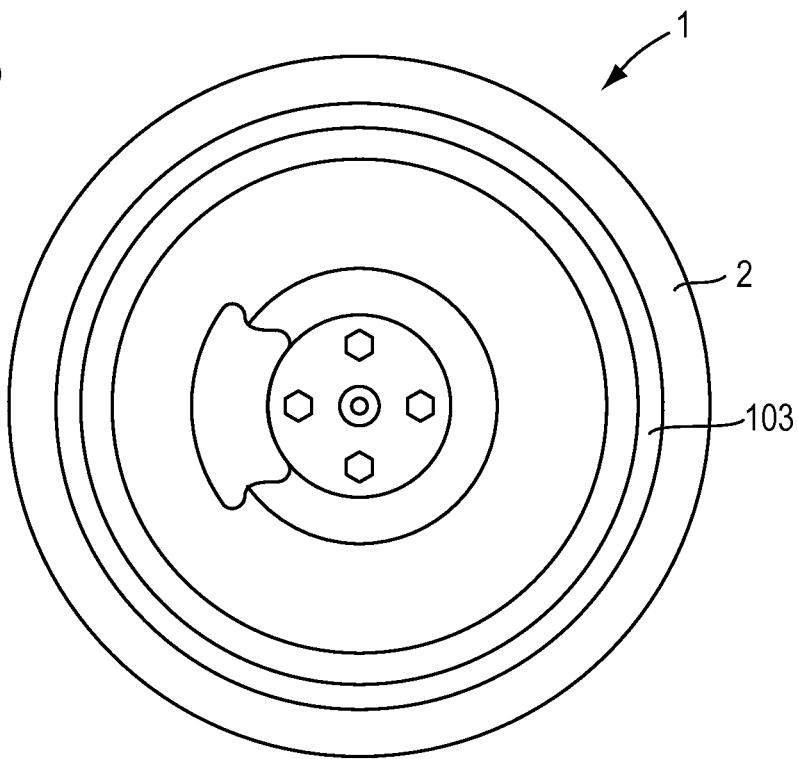
FIG. 5 is a side cross-sectional view of the tire and system of FIG. 1.

With reference again to FIG. 1, to capture the greatest amount of strain, in various embodiments, the reverse electrowetting pad 103 may comprise a single continuous, stretchable pad that extends around a rotation axis of the tire 1 (see FIG. 5) that is placed between the tread 2 and the body ply 3 of the tire 1 (see interface A in FIG. 2), for example, when the tire 1 is manufactured. The present disclosure, however, contemplates embedding the reverse electrowetting pad 103 at various locations within the tire 1, including, but not limited to, one or more of the interfaces A, B (between the body ply 3 and the steel belt 4A), C (between the steel belts 4A and 4b), and/or D (between the steel belt 4B and the inner liner 5) shown in FIG. 2.

Figure 6:
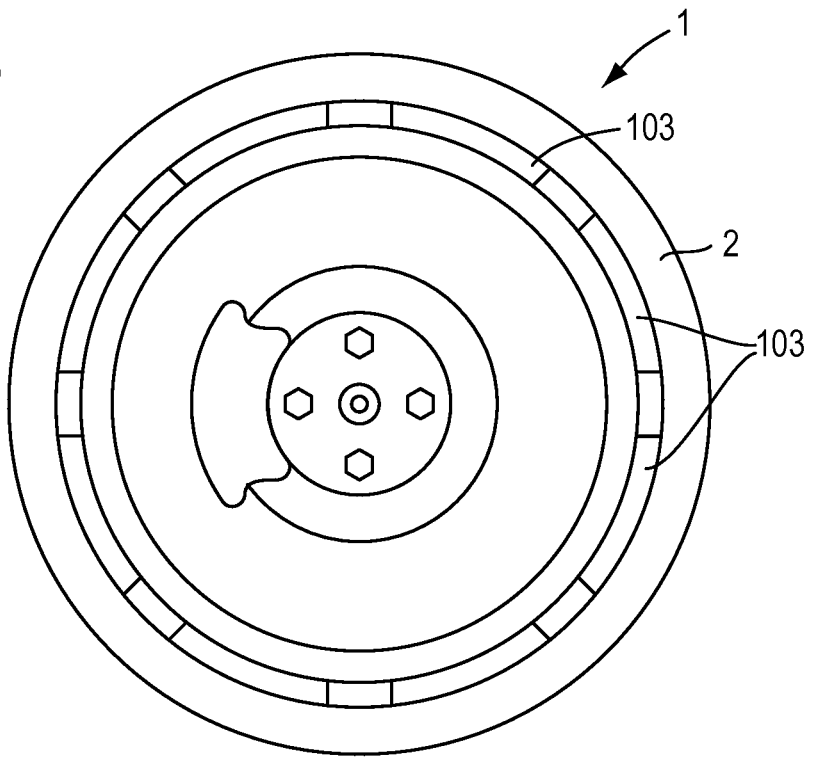
FIG. 6 is a side cross-sectional view of a tire with another exemplary embodiment of a system for generating power in accordance with the present disclosure.

Furthermore, the present disclosure contemplates a system for generating power 100 including any number and/or configuration (i.e., dimension and/or geometry) of reverse electrowetting pads 103 embedded within the tire 1 based, for example, on the proposed application (i.e. the types of mechanical forces to be captured) and the amount of power desired. Those of ordinary skill in the art would understand, therefore, that the system 100 illustrated in FIGS. 1-5 is exemplary only and intended to illustrate one embodiment of the present disclosure. Accordingly, power generation systems in accordance with the present disclosure may have various types, numbers, configurations, and/or arrangements of reverse electrowetting elements (e.g., pads) and controllers without departing from the scope of the present disclosure and claims, and are not bound by any specific pad placement requirements and/or geometries. For example, although the system 100 illustrated and described with reference to FIGS. 1-5 includes a single continuous reverse electrowetting pad 103, as shown in FIG. 6, various additional embodiments of the present disclosure contemplate a system that has a plurality of reverse electrowetting pads 103 arranged around the rotation axis of the tire 1. Furthermore, for ease of application, as described below with reference to FIG. 7, various further embodiments of the present disclosure contemplate a system in which the reverse electrowetting energy harvesting element is adhered to an interior surface of the tire 1 (see interface E in FIG. 2).

The energy harvesting elements of the present disclosure, therefore, allow for increased flexibility in design and placement of the elements within the system (i.e., since the elements are not bound by specific geometries). Furthermore, such energy harvesting elements may also provide for flexibility during the manufacturing process, also allowing for bonding opportunities of the elements within the tire layers.

With reference to FIG. 3, the controller 120 accumulates electric energy that is generated by the reverse electrowetting pad 103 and supplies the accumulated energy to at least one sub-assembly mounted on the tire 1, such as, for example, a tire pressure monitoring system (TPMS) 130 and/or an active air compensation system (AACS) 140 in order to power each respective system. The controller 120 may include, for example, an existing vehicle controller, or a dedicated controller, or control may be distributed among more than one vehicle controller, as would be understood by one ordinarily skilled in the art.

As shown in FIG. 3, in various additional embodiments, the system 100 may further include a rectifier 125, such as, for example, a full wave rectifier that is configured to convert the electric energy that is generated by the reverse electrowetting pad 103 from an alternating current to a direct current and supply the converted current to the controller 120. The controller 120 may, therefore, accumulate energy from the pad 103 via, for example, leads 114 connected to the pad 103 (see FIG. 1). An input side of the rectifier 125 is connected via the leads 114 to the reverse electrowetting pad 103 and the output side of the rectifier 125 is connected to the controller 120.

In various exemplary embodiments, the controller may comprise a storage unit 122, a CPU 124, and an intelligent power supply control unit 126 that is configured to both regulate and smooth the accumulated energy from the reverse electrowetting pad 103. In various embodiments, for example, the control unit 126 may include an electrical switch and a boost type power supply circuit or the like, which may turn on/off the electrical switch based on a control signal from the CPU 124, and thereby convert the accumulated energy into a voltage required for the circuit operation of the one or more sub-assemblies mounted on the tire 1. The controller 120 may then supply the resultant voltage to the one or more sub-assemblies, such as, for example to the TPMS 130 and/or AACS 140. The controller 120 may supply electric power to the TPMS 130 and/or AACS 140 via any technique, cabled or wireless, known to those of ordinary skill in the art, including, for example, via an antenna (not shown) located within the housing 101. As would be understood by those of ordinary skill in the art, the controller 120 may continuously accumulate, store (i.e. in the storage unit 122), and supply the energy that is generated via the reverse electrowetting pad 103 as the vehicle is driven (i.e., when the vehicle is moving and the tires are rotating).

As above, those of ordinary skill in the art would also understand that the system 100 illustrated and described with reference to FIGS. 1-5 is exemplary only and may have various types, numbers, and/or configurations of reverse electrowetting energy harvesting elements and controllers, including, for example, controllers comprising various additional components that are not illustrated in the exemplary embodiment of FIG. 3.

Figure 7:
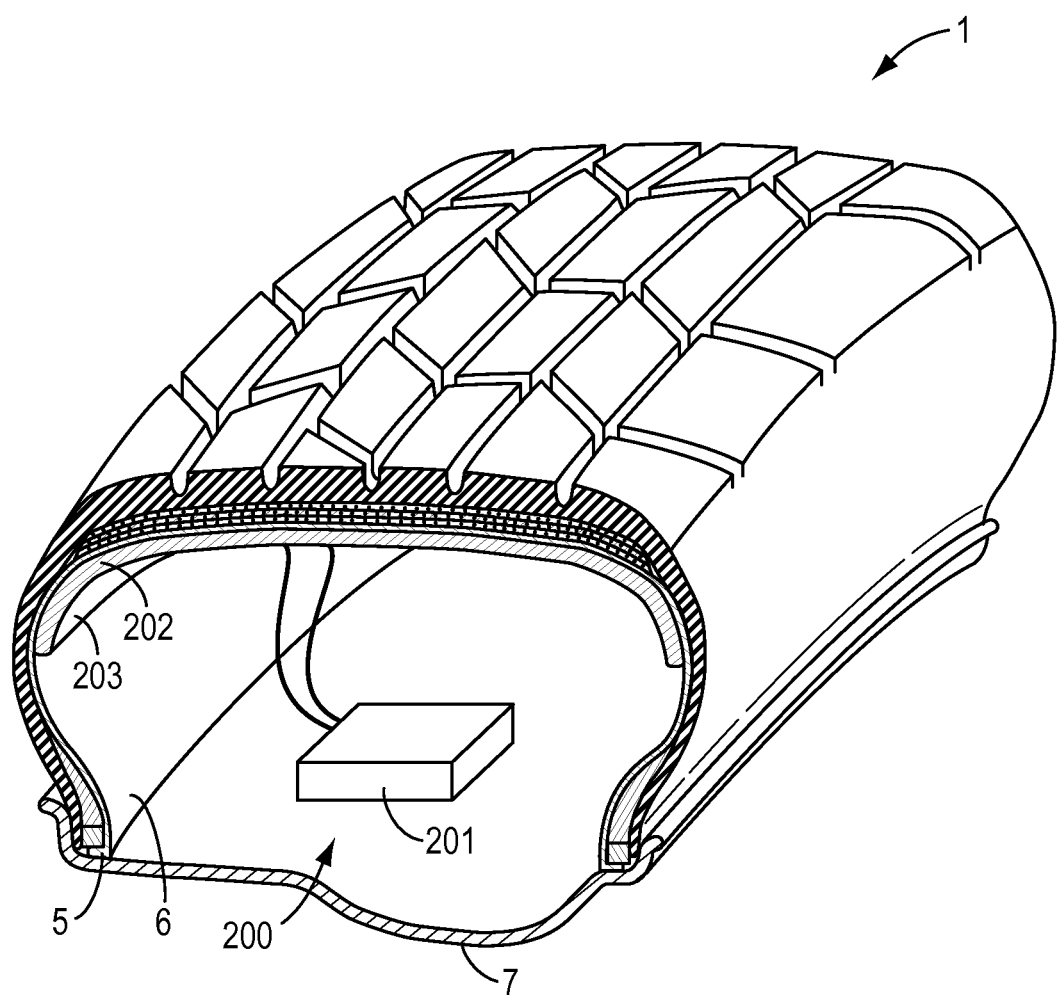
FIG. 7 is a schematic cross-sectional perspective view of a tire with yet another exemplary embodiment of a system for generating power in accordance with the present disclosure.

FIG. 7, for example, is a schematic cross-sectional perspective view of the tire 1 with another exemplary embodiment of a system for generating power 200 in accordance with the present disclosure. The system for generating power 200 includes a reverse electrowetting energy harvesting element 202 that is coupled to the tire 1 and at least one controller (not shown, and positioned within a housing 201 in FIG. 7) configured to accumulate electric energy generated by the harvesting element 202, and supply the accumulated electric energy to at least one sub-assembly that is mounted on the tire 1. As shown in FIG. 7, the reverse electrowetting harvesting element 202 may include at least one reverse electrowetting pad 203 that is adhered to an interior surface of the tire 1, such as, for example, to an interior surface 7 of the inner liner 5 of the tire 1. In various embodiments, for example, the reverse electrowetting pad 203 may comprise a single continuous, stretchable pad that extends around the rotation axis of the tire 1. Although not shown, in various additional embodiments, the system may comprise a plurality of reverse electrowetting pads arranged around the rotation axis of the tire 1.

The pad 203 may be adhered to the interior surface 7 by any method and/or technique known to those of ordinary skill in the art, including, but not limited to, via an adhesive and/or glue, after the tire 1 is cured.

To predict the approximate power output of the above described exemplary systems, calculations were made based on the power outputs reported in the Nature article for a reverse electrowetting energy harvester embedded within a sole of a shoe. The Nature article, for example, estimated that a reverse electrowetting energy harvester embedded within a sole with a contact area (with the ground) of 20 cm$^2$, which undergoes 2 mm of deformation, could generate up to about 10 watts of power. Accordingly, it was predicted that a vehicle tire, which has a larger contact area (with the road) and which undergoes a cyclic deformation of a greater magnitude, could generate a relatively large amount of power.

As summarized in Table 1 below, calculations were made to predict the power output in watts (W) at a contact surface area with the road for both a small tire having a width of about 195 mm and a large tire having a width of about 275 mm. Based on an assumption that the system includes a continuous reverse electrowetting pad adhered to an interior surface of the inner liner (similar to FIG. 7), having a max pad surface area ranging from about 659.40 in$^2$ to about 1318.80 in$^2$ (depending on the size of the tire), which undergoes a deformation of about 4 mm, the power output at the contact surface area was estimated to be 95.71 W for the small tire and 222.9 W for the large tire.

TABLE 1

Predicted Power Output at Contact Surface Area

| | Rim (in) | Width (mm) | Width (in) | Max Reverse Electrowetting Pad Surface Area (in$^2$) | Contact Surface Area (cm$^2$) | Contact Surface Area (in$^2$) | Power Output at contact surface Area (W) |
|---|---|---|---|---|---|---|---|
| Small tire | 15 | 185 | 7.28 | 659.4 | 191.42 | 29.67 | 95.71 |
| Larger tire | 20 | 275 | 10.83 | 1318.8 | 445.81 | 69.1 | 222.9 |

This relatively large power output may be attributed to: (1) the ability of the disclosed systems to capture the mechanical energy associated with the cyclical bulk strain deformations of the tire instead of just the vibrational energy of the tire, and (2) the design flexibility of the systems, which can maximize the surface area of the energy harvesting elements.

Accordingly, the systems and methods of the present disclosure can generate a relatively large amount of electric power to power various systems and sub-assemblies associated with the motor vehicle, including, for example, the TPMS and AACS described above. The systems of the present disclosure, for example, will allow for direct tire pressure monitoring, without the concern of conserving battery life. As would be understood by those of ordinary skill in the art, when a battery is used to power a TPMS there is always a concern that the battery will need to be serviced (or replaced), as the radio frequency (RF) communications of the TPMS need a large amount of power to overcome the damping effects of the tire. Accordingly, when a battery is used, to save energy and prolong battery life, many direct monitoring systems do not transmit information when the tire is not rotating and/or limit the times in which the tire pressure is measured and transmitted. Utilizing power generation systems of the present disclosure can, therefore, eliminate the concern over battery life and allow for continuous measurement of the tire pressure of the wheels of the motor vehicle.

Furthermore, the power generation systems of the present disclosure can also generate enough electric energy to power an active air compensation device to automatically maintain the pressure of the tires. In various embodiments of the present disclosure, for example, when the TPMS detects that tire pressure is low, the power generation system may trigger a pump that adds air to the tire through the AACS until the target tire pressure is achieved. Once the target pressure is achieved, the system may turn the AACS off.

An exemplary method for generating power for a sub-assembly of a motor vehicle in accordance with an exemplary embodiment of the present disclosure is set forth in the following description. An electric current can be generated via at least one reverse electrowetting energy harvesting element 102, 202 coupled to a tire 1 of the motor vehicle, and at least one sub-assembly 130, 140 associated with the tire 1 can be powered with the electric current. The electric current can, for example, be generated via at least one reverse electrowetting energy pad 103, 203. In various exemplary embodiments, the current can be generated via a reverse electrowetting energy pad 103 embedded within the tire 1. In various additional embodiments, the current can be generated via a reverse electrowetting pad 203 adhered to an interior surface 7 of the tire 1.

In this manner, the electric current can be generated by capturing mechanical energy associated with the tire 1. In various embodiments, for example, the electric current can be generated from strain that is produced by cyclic deformation of the tire 1 through rolling contact with, for example, a road surface. In various additional embodiments, the electric current can be generated by converting a mechanical vibration of the tire 1 to electrical energy. As discussed above, however, the present disclosure contemplates generating the electric current via reverse electrowetting energy harvesting elements having various actuation mechanisms and/or geometries, which are driven by various mechanical forces and displacements.

As further discussed above, the ability of the exemplary power generation methods to generate electric current via a broad range of mechanical forces and displacements allows the methods to generate a relatively large amount of power, such as, for example, about 95 watts to about 223 watts of power at the contact surface area, depending on the size of the tire.

Methods in accordance with the present disclosure may, therefore, power various sub-assemblies of the vehicle, including for, example, various sub-assemblies associated with the tire 1. In various embodiments, for example, the electric current generated by the at least one reverse electrowetting energy harvesting element 102, 202 may be used to power a tire pressure monitoring system 130 and/or an active air compensation system 140 associated with the tire 1.

While the present disclosure has been disclosed in terms of exemplary embodiments in order to facilitate better understanding of the disclosure, it should be appreciated that the disclosure can be embodied in various ways without departing from the principle of the disclosure. Therefore, the disclosure should be understood to include all possible embodiments which can be embodied without departing from the principle of the disclosure set out in the appended claims. For example, although the present disclosure has been discussed with regard to generating power for vehicle sub-assemblies associated with a rotating body of the vehicle, such as, for example, sub-assemblies mounted on a tire of the vehicle (e.g., TPMS and AACS), those of ordinary skill in the art would understand that the present teachings as disclosed would work equally well to generate power for other vehicle systems and sub-assemblies. Furthermore, although the present disclosure has been discussed with relation to automotive vehicles, those of ordinary skill in the art would understand that the present teachings as disclosed would work equally well for any type of vehicle having one or more tires, which undergo cyclic deformation during movement of the vehicle.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A system for generating power for an electric sub-assembly of a motor vehicle, the system comprising:
    at least one reverse electrowetting energy harvesting element coupled to a tire of the motor vehicle; and
    at least one controller configured to accumulate electric energy generated by the at least one reverse electrowetting energy harvesting element and supply the accumulated electric energy to at least one sub-assembly mounted on the tire.

2. The system of claim 1, wherein the at least one reverse electrowetting energy harvesting element comprises at least one reverse electrowetting pad.

3. The system of claim 2, wherein the at least one reverse electrowetting pad comprises a single continuous, stretchable reverse electrowetting pad that extends around a rotation axis of the tire.

4. The system of claim 2, wherein the at least one reverse electrowetting pad comprises a plurality of reverse electrowetting pads arranged around a rotation axis of the tire.

5. The system of claim 2, wherein the at least one reverse electrowetting pad is adhered to an interior surface of the tire.

6. The system of claim 2, wherein the at least one reverse electrowetting pad is embedded within the tire.

7. The system of claim 1, wherein the at least one controller is configured to regulate and smooth the accumulated electric energy.

8. The system of claim 1, wherein the at least one controller is configured to supply the accumulated electric energy to a tire pressure monitoring system.

9. The system of claim 1, wherein the at least one controller is configured to supply the accumulated electric energy to an active air compensation system.

10. The system of claim 1, further comprising a rectifier configured to convert the electric energy generated by the energy harvesting element from an alternating current to a direct current.

11. A method for generating power for an electric sub-assembly of a motor vehicle, the method comprising:
    generating an electric current via at least one reverse electrowetting energy harvesting element coupled to a tire of the motor vehicle;
    powering at least one sub-assembly associated with the tire with the electric current.

12. The method of claim 11, wherein generating the electric current comprises generating the electric current from strain produced by cyclic deformation of the tire through rolling contact with a road surface.

13. The method of claim 11, wherein generating the electric current comprises converting a mechanical vibration of the tire to electrical energy.

14. The method of claim 11, wherein generating the electric current comprises generating the electric current via at least one reverse electrowetting energy pad embedded within the tire.

15. The method of claim 11, wherein generating the electric current comprises generating the electric current via at least one reverse electrowetting energy pad adhered to an interior surface of the tire.

16. The method of claim 11, wherein generating the electric current comprises generating about 95 watts to about 223 watts of power at a contact surface area of the tire with a road.

17. The method of claim 11, wherein powering the at least one sub-assembly comprises powering a tire pressure monitoring system.

18. The method of claim 11, wherein powering the at least one sub-assembly comprises powering an active air compensation system.

19. The method of claim 11, wherein generating the electric current comprises generating an electric current for each tire of the motor vehicle via one or more reverse electrowetting pads coupled to each respective tire, and
    wherein powering the at least one sub-assembly comprises powering one or more sub-assemblies mounted to each respective tire via the respective electric current generated for each tire.

20. A method of assembling a system for generating power for an electric sub-assembly of a motor vehicle, the method comprising:
    embedding at least one reverse electrowetting energy harvesting element within a tire of the motor vehicle; and
    coupling the at least one reverse electrowetting energy harvesting element to at least one controller configured to accumulate electric energy generated by the at least one reverse electrowetting energy harvesting element and supply the accumulated electric energy to at least one sub-assembly mounted on the tire.

* * * * *